R. AMODIO.
VEHICLE WHEEL.
APPLICATION FILED OCT. 7, 1915.
1,266,089.
Patented May 14, 1918.
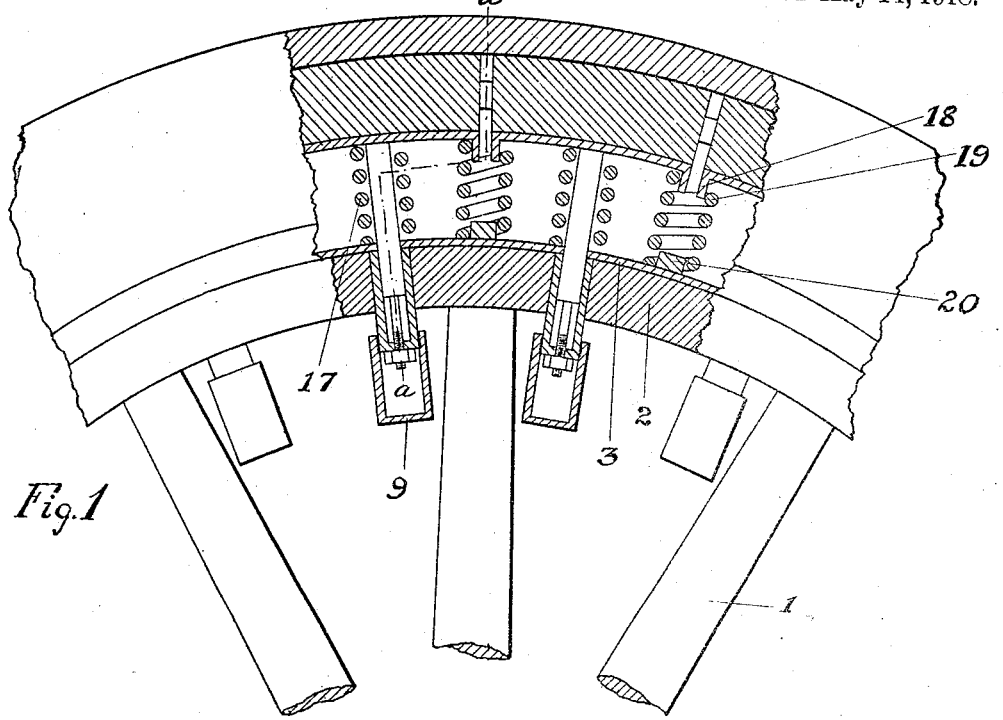
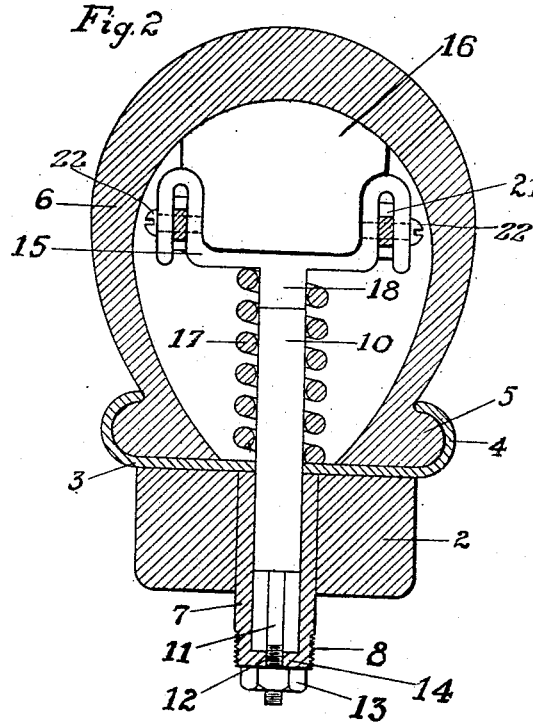
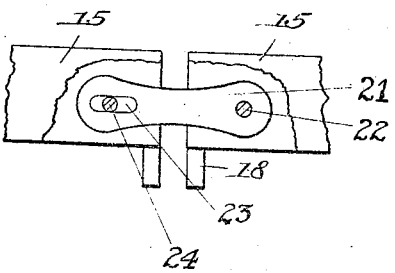
INVENTOR.
Roberto Amodio
BY
his ATTORNEY

UNITED STATES PATENT OFFICE.

ROBERTO AMODIO, OF ROCHESTER, NEW YORK, ASSIGNOR, BY DIRECT AND MESNE ASSIGNMENTS, TO AIRLESS AUTO WHEEL & TIRE COMPANY, INC., OF ROCHESTER, NEW YORK, A CORPORATION OF NEW YORK.

VEHICLE-WHEEL.

1,266,089.

Specification of Letters Patent.

Patented May 14, 1918.

Application filed October 7, 1915. Serial No. 54,653.

*To all whom it may concern:*

Be it known that I, ROBERTO AMODIO, of Rochester, county of Monroe, State of New York, have invented a new and useful Vehicle-Wheel, which invention is fully set forth in the following specification and shown in the accompanying drawings.

The present invention relates to vehicle wheels and more particularly to the type in which a substitute is employed for the usual inner air tube in pneumatic tires, and an object of this invention is to provide a construction which will be inexpensive to manufacture and strong and durable in use permitting the tire casing to be readily removed or fitted in place.

To these and other ends the invention consists in certain parts and combinations of parts all of which will be hereinafter described, the novel features being pointed out in the appended claim.

In the drawings:

Figure 1 is a view partly in circumferential section of a portion of a vehicle wheel;

Fig. 2 is a transverse section through the wheel on the line *a—a*, Fig. 1; and

Fig. 3 is a detail view showing the manner of connecting two of the plungers in order to prevent the turning of the latter and yet permit their relative movements in directions radial to the axis of the wheel.

Referring more particularly to the drawings, 1 indicates spokes supporting the wooden felly 2 which in turn is surrounded by the metallic rim 3, the latter having lateral curved clencher flanges 4 along opposite edges on its outer face to receive the usual beads 5 formed on the opposite sides of the tire casing 6.

Welded or otherwise secured to the inner face of the rim 3, are tubes 7 which extend through the wooden felly 2 and have their inner ends externally threaded at 8 to receive removable caps 9. Operating within each of these tubes is a plunger 10 which preferably has a reduced portion 11 at its inner end formed with screw threads 12 for engagement by a nut 13 which abuts the inner end of the tube 7, said end being turned inwardly at 14 to provide a proper seat for the nut. This inturned end is not engaged by the screw threads 12, the latter being of such a diameter as to enable them to move freely through the inturned portions 14.

The outer end of the plunger carries an enlarged portion or head 15 which is channeled on its outer face to receive a filler or body 16 of elastic material such as rubber which bears against the inner wall of the casing 6 to hold the latter distended. The body of material is of such a thickness that the casing of the wheel may be removed and the body of the material 16 will serve as a tread.

To the end that the plungers 10 will be yieldingly mounted, they are surrounded by coil springs 17, the inner ends of which abut the rim 3 while the outer ends abut the enlarged portions 15. The tension of these springs may be varied by the adjustment of the nuts 13, and the removal and fitting of the casing 6 is effected by compressing the springs through the medium of the nuts 13.

With the end in view of resiliently supporting the adjacent ends of the enlarged portions, each end of each enlarged portion is formed with an inwardly turned projection 18, and each two of these projections which lie in proximity to each other are engaged by a single helically coiled spring 19, the inner end of which abuts the rim 3 and surrounds a projection 20 on such rim to prevent lateral movement of such inner end.

In order to tie adjacent plungers together, there are provided links 21 arranged in pairs each of which connects two proximate plunger heads, the members of such pair being arranged on opposite sides of the head and each being pivoted at one end at 22 to one plunger head and having its other end provided with a slot 23 operating on a pin 24 on the other plunger head. Suitable channels for the reception of the link members are provided on opposite sides of the plunger heads. It is apparent that these links serve to hold the plunger members against turning yet, at the same time, they permit the relative yielding of the plungers as each is pivoted to one plunger and has a shiftable fulcrum on the other.

The operation of the invention will be apparent from the foregoing description but may be summarized as follows: To fit the tire, the caps 9 are removed and the nuts 13 turned to draw the plungers inwardly in order to compress the springs 17 and 19. After the tire casing has had its beads 5 engage with the flanges 4, the nuts 13 are again turned to permit the springs 17 and 19 to expand so that the rubber portion 16 will engage the inner wall of the casing 6 and hold the latter distended. When the wheel is in use, the springs 17 and 19 are compressed when the weight of the vehicle is on the adjacent portion of the tire casing and expand when the weight is relieved therefrom. If the tire casing be removed, the rubber portions 16 will serve as the tread of the wheel.

What I claim as my invention and desire to secure by Letters Patent is:—

A vehicle wheel comprising a rim, plungers guided in the rim and having enlarged heads formed with channels along opposite sides, and links connecting said heads and arranged in said channels in pairs on opposite sides of the heads, each link being pivoted to one head and having a shifting fulcrum on another.

ROBERTO AMODIO.

Copies of this patent may be obtained for five cents each, by addressing the "Commissioner of Patents, Washington, D. C."